(12) United States Patent
Ryu et al.

(10) Patent No.: US 10,972,154 B2
(45) Date of Patent: Apr. 6, 2021

(54) METHODS AND APPARATUS FOR DYNAMIC SOFT COMBINING FOR MULTI-BEAM TRANSMISSIONS

(71) Applicant: QUALCOMM Incorporated, San Diego, CA (US)

(72) Inventors: Jung Ho Ryu, Fort Lee, NJ (US); Kiran Venugopal, Raritan, NJ (US); Makesh Pravin John Wilson, San Diego, CA (US); Tianyang Bai, Bridgewater, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/737,656

(22) Filed: Jan. 8, 2020

(65) Prior Publication Data

US 2020/0228168 A1    Jul. 16, 2020

Related U.S. Application Data

(60) Provisional application No. 62/790,919, filed on Jan. 10, 2019.

(51) Int. Cl.
*H04B 7/0408* (2017.01)
*H04B 7/06* (2006.01)

(52) U.S. Cl.
CPC ........... *H04B 7/0408* (2013.01); *H04B 7/063* (2013.01)

(58) Field of Classification Search
CPC .... H04B 7/0408; H04B 7/063; H04B 7/0695; H04L 1/1845
See application file for complete search history.

(56) References Cited

U.S. PATENT DOCUMENTS

| 2010/0232373 | A1* | 9/2010 | Nory | H04W 72/1289 |
| | | | | 370/329 |
| 2013/0172002 | A1 | 7/2013 | Yu et al. | |
| 2016/0242061 | A1* | 8/2016 | Harada | H04L 5/0098 |
| 2020/0221428 | A1* | 7/2020 | Moon | H04W 72/12 |

FOREIGN PATENT DOCUMENTS

| EP | 3606129 A1 | 2/2020 |
| EP | 3609112 A1 | 2/2020 |
| KR | 20180123417 A | 11/2018 |
| WO | 2018173124 A1 | 9/2018 |

OTHER PUBLICATIONS

International Search Report and Written Opinion—PCT/US2020/012911—ISAEPO—dated Apr. 21, 2020.

* cited by examiner

*Primary Examiner* — Vineeta S Panwalkar
(74) *Attorney, Agent, or Firm* — Arent Fox, LLP/Qualcomm Incorporated

(57) ABSTRACT

Aspects of the present disclosure include methods, apparatuses, and computer readable media for receiving a plurality of beams from a base station (BS), measuring a value of a parameter associated with each of the plurality of beams, generating a report including at least the values of the parameter associated with the plurality of beams and/or an indication to implement soft-combining, transmitting the report to the BS, in response to transmitting the report: receiving a first beam including first redundant information and a second beam including second redundant information, and generating combined information based on the first redundant information and the second redundant information.

30 Claims, 8 Drawing Sheets

800

802
TRANSMITTING A PLURALITY OF BEAMS TO A UE

804
RECEIVING A REPORT INCLUDING AT LEAST VALUES OF AT LEAST ONE PARAMETER ASSOCIATED WITH THE PLURALITY OF BEAMS OR AN INDICATION TO IMPLEMENT SOFT-COMBINING

806
IN RESPONSE TO RECEIVING THE REPORT: SELECTING AT LEAST A FIRST BEAM AND A SECOND BEAM OF THE PLURALITY OF BEAMS BASED ON THE VALUES OF THE AT LEAST ONE PARAMETER AND/OR THE INDICATION

808
TRANSMITTING THE FIRST BEAM INCLUDING FIRST REDUNDANT INFORMATION AND THE SECOND BEAM INCLUDING SECOND REDUNDANT INFORMATION

*FIG. 8*

METHODS AND APPARATUS FOR DYNAMIC SOFT COMBINING FOR MULTI-BEAM TRANSMISSIONS

CROSS REFERENCE TO RELATED APPLICATIONS

The present application claims priority to U.S. Provisional Application No. 62/790,919, filed on Jan. 10, 2019, entitled "Methods and Apparatus for Dynamic Soft Combining for Multi-Beam Transmission, the contents of which are incorporated by reference in their entireties.

BACKGROUND

Aspects of the present disclosure relate generally to wireless communication networks, and more particularly, to apparatus and methods for implementing multi-beam transmissions between a base station (BS) and a user equipment (UE).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a communication network, the BS may transmit redundant information using multiple beams. The UE may select one of the multiple beams and extract the information from the selected beam. However, the rate of information transfer is limited to the rate of selected beam (i.e., the rate of information transfer does not exceed the highest rate of any individual beam). While the UE may combine multiple beams for information transfer, the process may be resource intensive for the UE and not always yield an increase in the rate of transfer. Therefore, improvements in multi-beam transmissions may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for receiving a plurality of beams from a BS, measuring a value of at least a parameter associated with each of the plurality of beams, generating a report including at least the values of the parameter associated with the plurality of beams or an indication to implement soft-combining, transmitting the report to the BS, in response to transmitting the report: receiving a first beam including first redundant information and a second beam including second redundant information, and generating combined information based on the first redundant information and the second redundant information.

Other aspects of the present disclosure include a UE having a memory, a transceiver, and one or more processors operatively coupled with the memory and the transceiver, the one or more processors configured to perform the steps of receiving a plurality of beams from a BS, measuring a value of at least one parameter associated with each of the plurality of beams, generating a report including at least the values of the at least one parameter associated with the plurality of beams or an indication to implement soft-combining, transmitting the report to the BS, in response to transmitting the report: receiving a first beam including first redundant information and a second beam including second redundant information, and generating combined information based on the first redundant information and the second redundant information.

An aspect of the present disclosure includes a UE including means for receiving a plurality of beams from a BS, means for measuring a value of at least one parameter associated with each of the plurality of beams, means for generating a report including at least the values of the at least one parameter associated with the plurality of beams or an indication to implement soft-combining, means for transmitting the report to the BS, in response to transmitting the report: means for receiving a first beam including first redundant information and a second beam including second redundant information, and means for generating combined information based on the first redundant information and the second redundant information.

Some aspects of the present disclosure include non-transitory computer readable media having instructions stored therein that, when executed by one or more processors of a UE, cause the one or more processors to perform the steps of receiving a plurality of beams from a BS, measuring a value of at least one parameter associated with each of the plurality of beams, generating a report including at least the values of the at least one parameter associated with the plurality of beams or an indication to implement soft-combining, transmitting the report to the BS, in response to transmitting the report: receiving a first beam including first redundant information and a second beam including second redundant information, and generating combined information based on the first redundant information and the second redundant information.

Aspects of the present disclosure include methods for transmitting a plurality of beams to a user equipment (UE), receiving a report including at least values of at least one parameter associated with the plurality of beams or an indication to implement soft-combining, and in response to receiving the report, selecting at least a first beam and a second beam of the plurality of beams based on the values of the at least one parameter and/or the indication, and transmitting the first beam including first redundant information and the second beam including second redundant information.

Other aspects of the present disclosure include a UE having a memory, a transceiver, and one or more processors operatively coupled with the memory and the transceiver, the one or more processors configured to transmit a plurality of beams to a user equipment (UE), receive a report including at least values of at least one parameter associated with the plurality of beams or an indication to implement soft-combining, and in response to receiving the report, select at least a first beam and a second beam of the plurality of beams based on the values of the at least one parameter and/or the indication, and transmit the first beam including first redundant information and the second beam including second redundant information.

An aspect of the present disclosure includes a UE including means for transmitting a plurality of beams to a user equipment (UE), means for receiving a report including at least values of at least one parameter associated with the plurality of beams or an indication to implement soft-combining, and in response to receiving the report, means for selecting at least a first beam and a second beam of the plurality of beams based on the values of the at least one parameter and/or the indication, and means for transmitting the first beam including first redundant information and the second beam including second redundant information Some aspects of the present disclosure include non-transitory computer readable media having instructions stored therein that, when executed by one or more processors of a UE, cause the one or more processors to transmit a plurality of beams to a user equipment (UE), receive a report including at least values of at least one parameter associated with the plurality of beams or an indication to implement soft-combining, and in response to receiving the report, select at least a first beam and a second beam of the plurality of beams based on the values of the at least one parameter and/or the indication, and transmit the first beam including first redundant information and the second beam including second redundant information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 8 is a process flow diagram, from a base station perspective, of an example of a method for implementing dynamic soft-combining for multi-beam transmissions, such as, for example, PDCCH.

DETAILED DESCRIPTION

Figure 1:
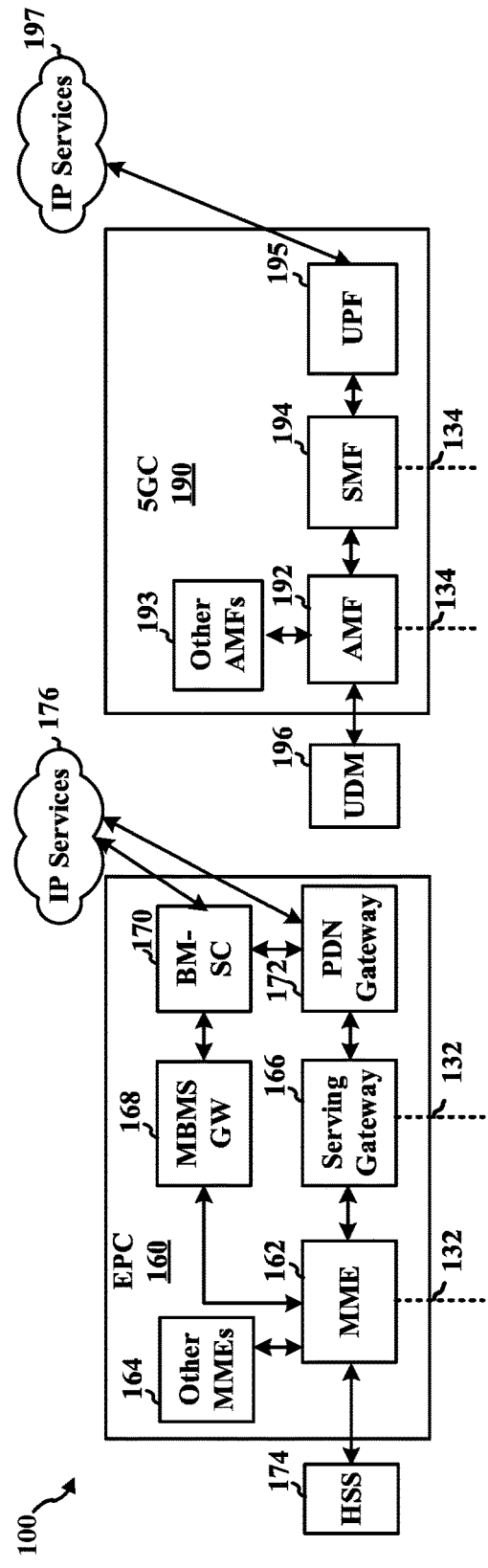
FIG. 1 is a diagram illustrating an example of a wireless communications system and an access network.
Figure 1:
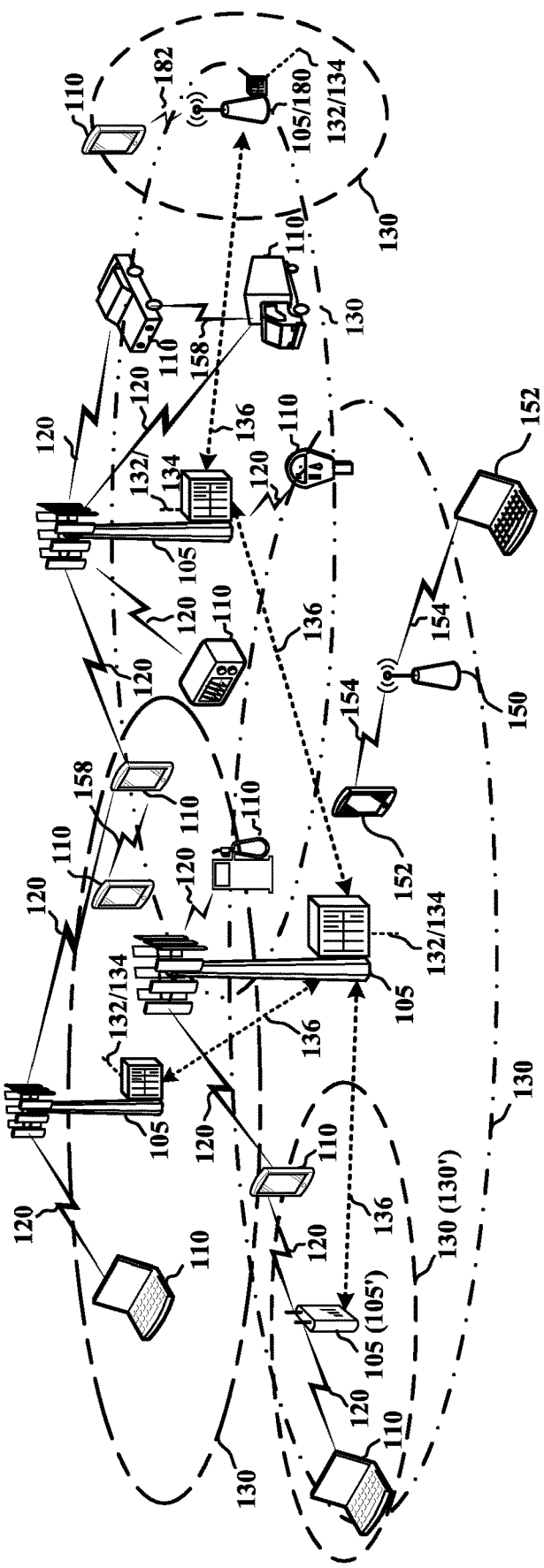

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media.

Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In certain aspects of the present disclosure, a device (e.g., a base station (BS)) may transmit multiple copies of information (e.g., physical downlink control channel (PDCCH) information) via multiple beams. Another device (e.g., a user equipment (UE)) may receive the information transmitted by two or more of the multiple beams, and generate combined information based on the information transmitted by the two or more of the multiple beams. The combined information (e.g., combined PDCCH information) may include a lower error rate than such information transmitted by a single beam.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells.

The BS 105 configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). The BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 136 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG).

The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
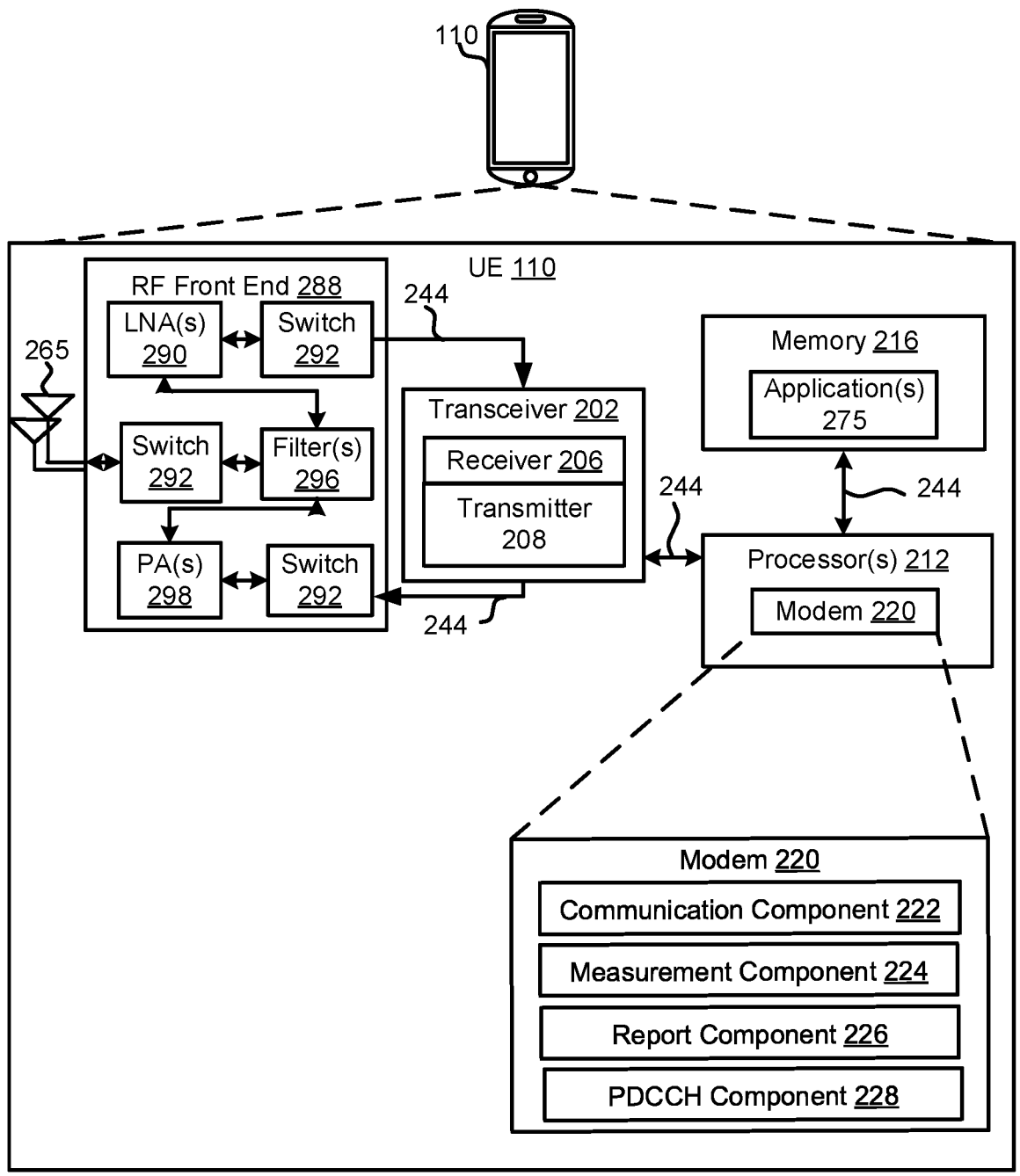
FIG. 2 is a schematic diagram of an example of a user equipment.

Referring to FIG. 2, one example of an implementation of the UE 110 may include a modem 220 having a communication component 222, a measurement component 224, a report component 226, and a PDCCH component 228. The communication component 222 and/or the modem 220 the UE 110 may be configured to communicate with the BS 105 via a cellular network, a Wi-Fi network, or other wireless and wired networks. The measurement component 224 may measure the performance metrics (e.g., a reference signal received power (RSRP), a reference signal received quality (RSRQ), a signal-to-noise ratio (SNR), or a signal-to-interference-plus-noise ratio (SINR)) of the one or more beams. The measurement component 224 may also obtain other values. The report component 226 may produce a report of the performance metrics. Other values may also be included in the report. The PDCCH component 228 may generate the PDCCH information from the selected beams. The modem 220 may receive and transmit data packets.

In some implementations, the UE 110 may include a variety of components, some of which have already been described above, but including components such as one or more processors 212 and memory 216 and transceiver 202 in communication via one or more buses 244, which may operate in conjunction with the modem 220, the communication component 222, the measurement component 224, the report component 226, and/or the PDCCH component 228 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays, and may be controlled for beamforming communications.

In an aspect, the one or more processors 212 may include the modem 220 that uses one or more modem processors. The various functions related to the communication component 222, the measurement component 224, the report component 226, and/or the PDCCH component 228 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. Additionally, the modem 220 may configure the UE 110 along with the measurement component 224, the report component 226, and/or the PDCCH component 228, and the processors 212. In other aspects, some of the features of the one or more processors 212 and/or the modem 220 associated with the communication component 222 may be performed by transceiver 202.

Also, memory 216 may be configured to store data used herein and/or local versions of applications 275 or the communication component 222 and/or one or more subcomponents of the communication component 222 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222 and/or one or more of its subcomponents, and/or data associated therewith, when UE 110 is operating at least one processor 212 to execute the communication component 222, the measurement component 224, the report component 226, and/or the PDCCH component 228 and/or one or more of their subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiver. In an aspect, receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
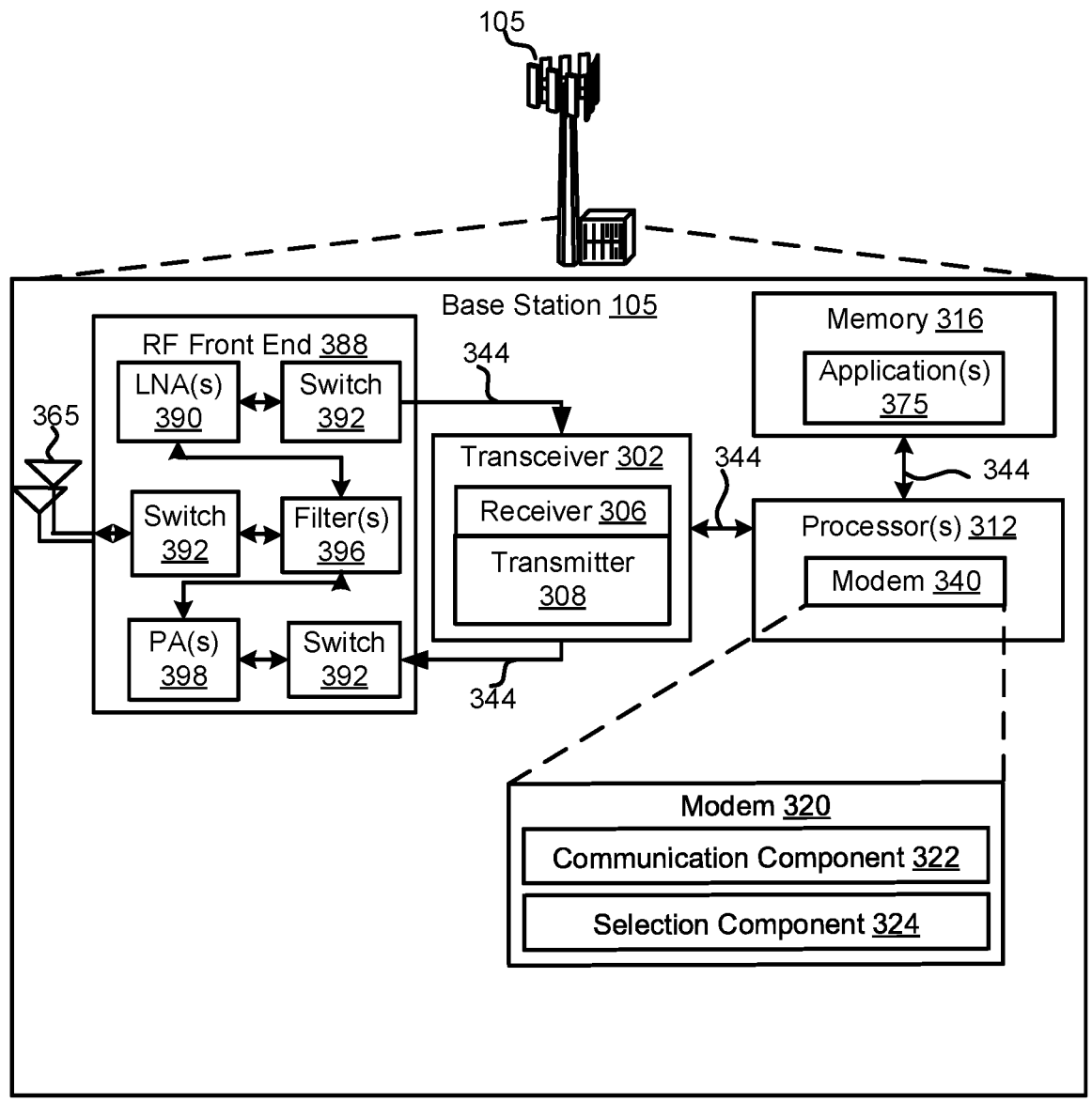
FIG. 3 is a schematic diagram of an example of a base station.

Referring to FIG. 3, one example of an implementation of the BS 105 may include a modem 340 with a communication component 322 and a selection component 324. The communication component 322 may be configured to communicate with one or more UEs 110 and/or other BS 105, such as sending/receiving messages to the UEs 110 and/or other BS 105. The communication component 322 and/or modem 340 of the BS 105 may be configured to communicate with other BS 105 and UEs 110 via a cellular network, a Wi-Fi network, or other wireless and wired networks. The selection component 324 may be configured to select one or more beams for the soft-combining procedure. The modem 320 may receive and transmit data packets.

In some implementations, the BS 105 may include a variety of components, some of which have already been described above, but including components such as one or more processors 312 and memory 316 and transceiver 302 in communication via one or more buses 344, which may operate in conjunction with the modem 340 and the communication component 322 to enable one or more of the functions described herein related to communicating with the UE 110. Further, the one or more processors 312, modem 340, memory 316, transceiver 302, RF front end 388 and one or more antennas 365, may be configured to support voice and/or data calls (simultaneously or non-simultaneously) in one or more radio access technologies. The one or more antennas 365 may include one or more antennas, antenna elements and/or antenna arrays, and may be controlled for beamforming communications.

In an aspect, the one or more processors 312 may include the modem 340 that uses one or more modem processors. The various functions related to the communication component 322 may be included in the modem 340 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. Additionally, the modem 340 may configure the BS 105 and processors 312. In other aspects, some of the features of the one or more processors 312 and/or the modem 340 associated with the communication component 322 may be performed by transceiver 302.

Also, memory 316 may be configured to store data used herein and/or local versions of applications 375 or the communication component 160 and/or one or more subcomponents of the communication component 322 being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322 and/or one or more of its subcomponents, and/or data associated therewith, when the BS 105 is operating at least one processor 312 to execute the communication component 322 and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). Receiver 306 may be, for example, a RF receiver. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 340 may configure transceiver 302 to operate at a specified frequency and power level based on the base station configuration of the BS 105 and the communication protocol used by the modem 340.

In an aspect, the modem 340 may be a multiband-multimode modem, which may process digital data and communicate with transceiver 302 such that the digital data is sent and received using transceiver 302. In an aspect, the modem 340 may be multiband and be configured to support multiple frequency bands for a specific communications protocol. In an aspect, the modem 340 may be multimode and be configured to support multiple operating networks and communications protocols. In an aspect, the modem 340 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
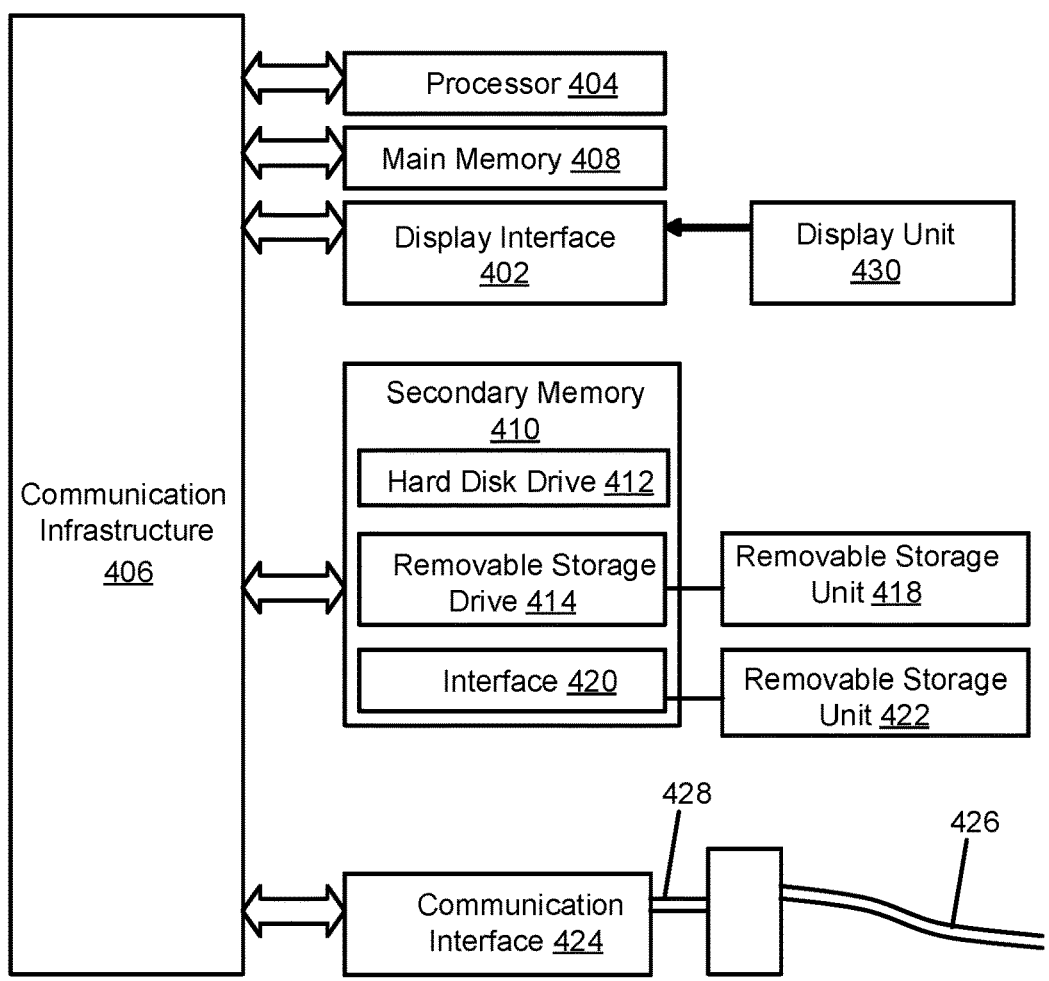
FIG. 4 is a schematic diagram of an example of a computer system for implementing a core network.

Referring now to FIG. 4, the core network 115 may be implemented as one or more core network devices, such as an example of a computer system 400. The computer system 400 may be a hardware system, a virtual system, a cloud-based system, or a combination thereof. The computer system 400 includes one or more processors, such as the processor 404. The processor 404 is communicatively coupled with a communication infrastructure 406 (e.g., a communications bus, cross-over bar, or network).

The computer system 400 may include a display interface 402 that forwards graphics, text, and other data from the communication infrastructure 406 (or from a frame buffer not shown) for display on a display 430. Computer system 400 also includes a main memory 408, preferably random access memory (RAM), and may also include a secondary memory 410. The secondary memory 410 may include, for example, a hard disk drive 412, and/or a removable storage drive 414, representing a floppy disk drive, magnetic tape drive, optical disk drive, universal serial bus (USB) flash drive, etc. The removable storage drive 414 reads from and/or writes to a first removable storage unit 418 in a well-known manner. The first removable storage unit 418 represents a floppy disk, magnetic tape, optical disk, USB flash drive etc., which is read by and written to removable storage drive 414. As will be appreciated, the first removable storage unit 418 includes a computer usable storage medium having stored therein computer software and/or data.

Alternative aspects of the present disclosure may include secondary memory 410 and may include other similar devices for allowing computer programs or other instructions to be loaded into computer system 400. Such devices may include, for example, a second removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units (not shown) and interfaces 420, which allow software and data to be transferred from the second removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using one or more of a wire or cable, fiber optics, telephone line, cellular link, RF link and/or other communications channels. In this document, the terms "computer program medium" and "computer usable medium" are used to refer generally to media such as the first removable storage drive 418, a hard disk installed in hard disk drive 412, and signals 428. These computer program products provide software to the computer system 400. Aspects of the present disclosure are directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features in accordance with aspects of the present disclosure, as discussed herein. In particular, the computer programs, when executed, enable the processor 404 to perform the features in accordance with aspects of the present disclosure. Accordingly, such computer programs represent controllers of the computer system 400.

In an aspect of the present disclosure where the method is implemented using software, the software may be stored in a computer program product and loaded into computer system 400 using removable storage drive 414, hard drive 412, or communications interface 420. The control logic (software), when executed by the processor 404, causes the processor 404 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 5:
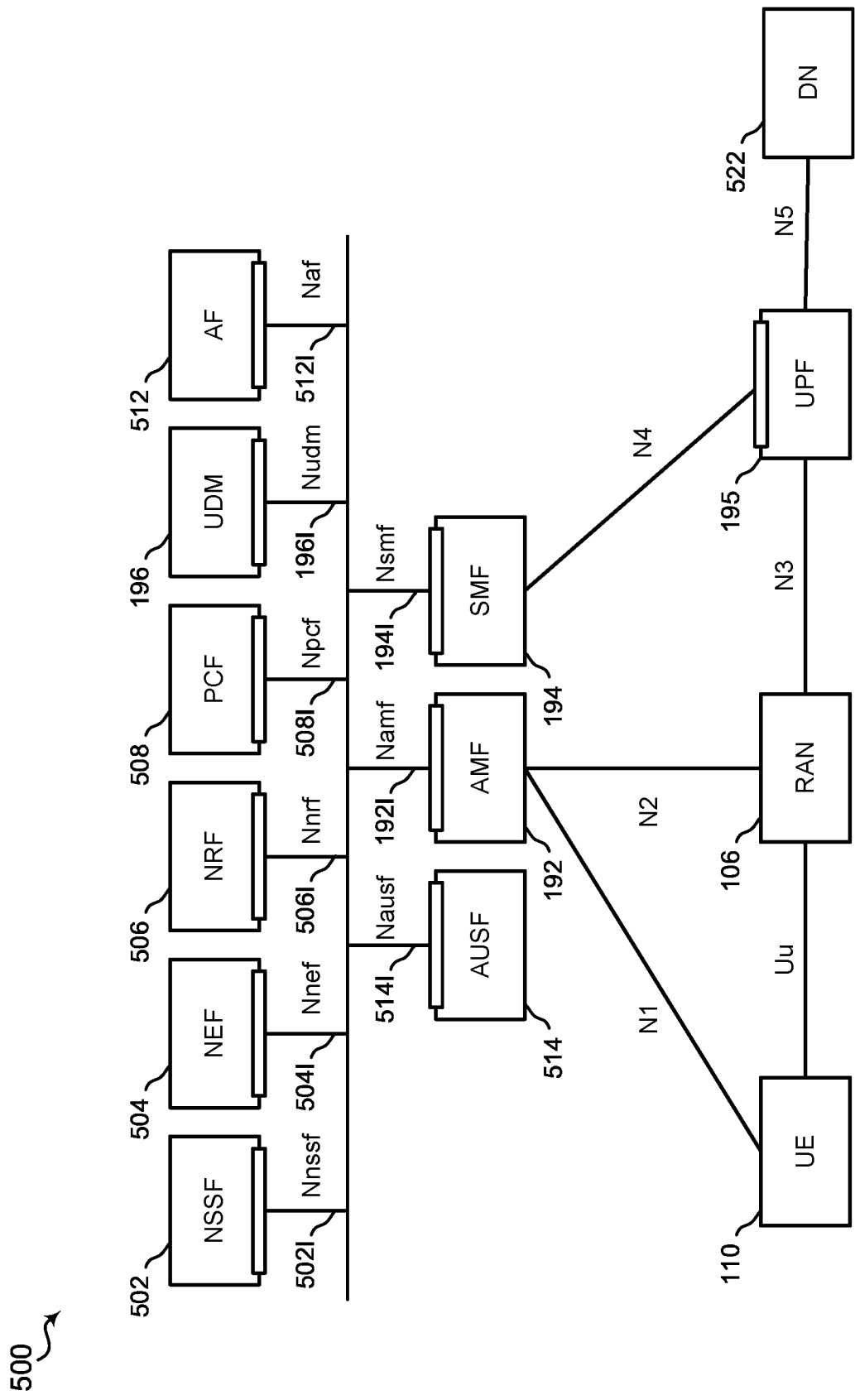
FIG. 5 is an example of a functional diagram illustrating the service-based architecture (SBA)

Turning now to FIG. 5, a service based architecture (SBA) 500 of the wireless communication network 100 may include a number of interconnected network functions (NFs). The SBA 500 may include a network slice selection function (NSSF) 502 that may support the selection of the network slice instances to serve the one or more UEs 110, and determines the allowed network slice selection assistance information and the access and mobility management function (AMF) set to be used to serve the one or more UEs 110. The NSSF 502 may communicate with other functions within the SBA 500 via a Nnssf 502I interface. The SBA 500 may include a network exposure function (NEF) 504 that may support exposure of capabilities and events, secure provision of information from external application to various wireless communication networks, and translation of internal and external information. The NEF 504 may communicate with other functions within the SBA 500 via a Nnef 504I interface.

Still referring to FIG. 5, the SBA 500 may include a network function repository function (NRF) 506 that may support service discovery functions and may maintain NF profiles and available NF instances. The NRF 506 may communicate with other functions within the SBA 500 via a Nnrf 506I interface. The SBA 500 may include a policy control function (PCF) 508 that may support unified policy framework, provide policy rules to control plane (CP) functions, access subscription information for policy decisions in unified data repository (UDP). The PCF 508 may communicate with other functions within the SBA 500 via a Npcf 508I interface.

Still referring to FIG. 5, the SBA 500 may include the UDM 196 that may support the generations of authentication and key agreement (AKA) credentials, user identification handling, access authorization, and subscription management. The UDM 196 may communicate with other functions within the SBA 500 via a Nudm 196I interface. The SBA 500 may include an application function (AF) 512 that may support application influence on traffic routing and interaction with policy framework for policy control. The AF 512 may communicate with other functions within the SBA 500 via a Naf 512I interface.

Still referring to FIG. 5, the SBA 500 may include an authentication server function (AUSF) 514 that may serve as an authentication server. The AUSF 514 may communicate with other functions within the SBA 500 via a Nausf 514I interface. The SBA 500 may include the AMF 192 that may support the termination of non-access-stratum (NAS) signaling, NAS ciphering and integrity protection, registration management, connection management, mobility management, access authentication and authorization, security context management. The AMF 192 may communicate with other functions within the SBA 500 via a Namf 192I interface. The AMF 192 may also communicate with the UE 110 via the N1 interface and a RAN 106 with the N2 interface.

The RAN 106 may be a network entity residing between the core network 115 and the UE 110. The RAN 106 may be implemented, for example, by the BS 105. The RAN 106 may relay data between the core network 115 and the UE 110.

Still referring to FIG. 5, the SBA 500 may include the SMF 194 that may support session management (session establishment, modification, release), UE internet protocol (IP) address allocation & management, dynamic host configuration protocol functions, termination of NAS signaling related to session management, downlink data notification, traffic steering configuration for UPF for proper traffic routing. The SMF 194 may communicate with other functions within the SBA 500 via a Nsmf 194I interface. The SBA 500 may include the UPF 195 that may support packet routing & forwarding, packet inspection, quality of service (QoS) handling, act as the external PDU session interface to the data network (DN) 522, and is an anchor point for both intra radio access technology (RAT) and inter-RAT mobility. The UPF 195 may communicate with the SMF 194 via a N4 interface, the DN 522 via the N5 interface, and the RAN 106 via the N3 interface.

In some implementations, the RAN 106 and the UE 110 may communicate via the Uu (wireless radio or "air") interface.

Figure 6:
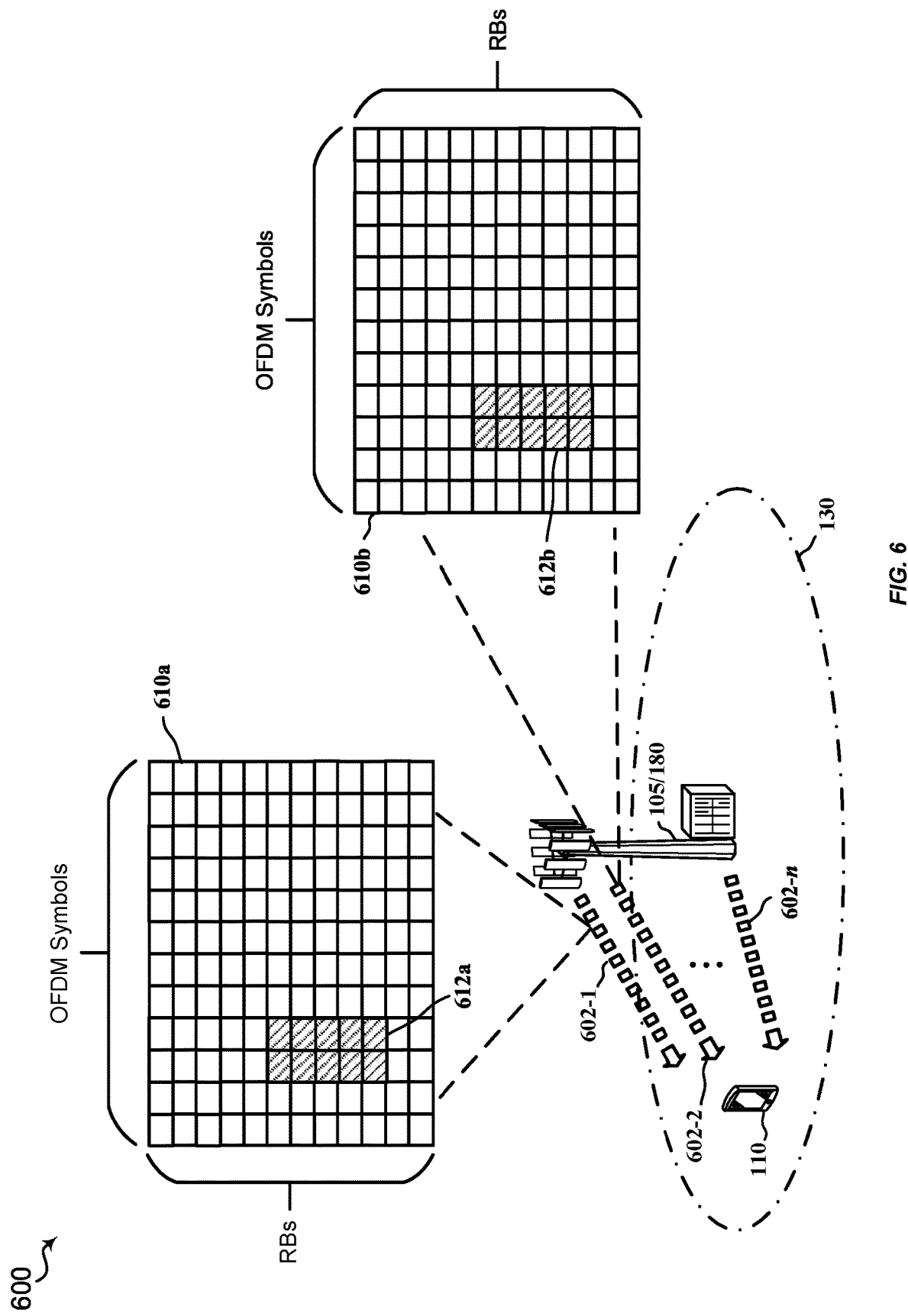
FIG. 6 is a schematic diagram illustrating an example of an environment for implementing dynamic soft-combining for multi-beam transmissions, such as, for example, physical downlink control channel (PDCCH)

Turning now to FIG. 6, an example of an environment 600 for implementing the dynamic soft-combining procedure for multi-beam transmission, such as, for example, PDCCH, may include the BS 105, such as the gNB 180, having the coverage area 130 and the UE 110. In certain implementations, the BS 105 may transmit one or more reference signals via beams 602 (i.e., n beams). While the example below illustrates multi-beam PDCCH, the dynamic soft-combining procedure may be implemented for other multi-beam transmissions. Non-limiting examples of other multi-beam transmissions may include physical downlink shared channel (PDSCH), physical random access channel (PRACH), physical broadcast channel (PBCH), physical uplink control channel (PUCCH), etc.

In certain aspects, the UE 110 may measure the RSRP, RSRQ, SNR, and/or the SINR values of the beams 602. The UE 110 may use the received reference signals to perform the measurements.

In certain examples, the UE 110 may generate a Level-1 (L1) report including the RSRP values of the beams 602, the RSRQ values of the beams 602, the SNR values of the beams 602, and/or the SINR values of the beams 602 back to the BS 105. In an optional implementations, the UE 110 may select (e.g., indicated in the L1 report) two or more beams having the best performance, based on evaluating certain parameters relating to the one or more reference signals, for soft-combining of PDCCH received on the two or more selected beams. For example, the UE 110 may select two or more beams having the highest RSRP, the highest RSRQ, the highest SNR, and/or the highest SINR values to perform soft-combining.

In some implementations, the UE 110 may also include an indication in the L1 report. The indication may provide a way to inform the BS 105 that the UE 110 may be prepared to utilize the two or more selected beams (e.g., beams with the highest RSRP, RSRQ, SNR, and/or SINR) to perform soft-combining of PDCCH. The UE 110 may first determine that the two or more selected beams satisfy one or more criteria, such as the two or more selected beams having substantially similar RSRP, RSRQ, SNR, and/or SINR values (described in further detail below). The indication may include an instruction to the BS 105 to transmit multiple PDCCH's that can be soft-combined by the UE, or report relevant values (RSRP, RSRQ, SNR, and/or SINR of the beams 602 or the selected beams).

In an aspect, the UE 110 may transmit the L1 report to the BS 105. In response to the L1 report, the BS 105 may transmit PDCCH information, such as downlink control information (DCI), hybrid automatic repeat request (HARQ) information, scheduling assignment/grants, control format indicator, to the UE 110. The BS 105 may utilize the content of the L1 report to select two or more beams having the best performance for the soft-combing procedure using multi-beams. In some implementations, the BS 105 may utilize beamforming techniques to transmit the PDCCH information to the UE 110. The BS 105 may transmit copies of the PDCCH information (e.g., PDCCH redundant information) to the UE 110 via beams selected by the BS 105 and/or the UE 110, such as a first beam 602-1 and a second beam 602-2. The first beam 602-1 may be associated with a first PDCCH and the second beam 602-2 may be associated with a second PDCCH. The first beam 602-1 and the second beam 602-2 may be selected due to superior RSRP, RSRQ, SNR, and/or SINR values to other beams in the beams 602. In a non-limiting example, the first beam 602-1 and the second beam 602-2 may include substantially similar RSRP, RSRQ, SNR, and/or SINR values. The difference between the RSRP, RSRQ, SNR, and/or SINR values of the first beam 602-1 and the second beam 602-2 may be 1%, 2%, 5%, 10%, 12%, or 15% of the RSRP, RSRQ, SNR, and/or SINR value of the first beam 602-1 or the second beam 602-2. In another example, the difference between the RSRP, RSRQ, SNR, and/or SINR values of the first beam 602-1 and the second beam 602-2 may be 1 decibel (dB), 2 dB, 5 dB or 10 dB.

In a certain example, the BS 105 may transmit first PDCCH redundant information via the first beam 602-1. The first PDCCH redundant information may be transmitted via a first encoding method (e.g., such as the polar code, block code, convolution code, or low density parity check code (LDPC)). The second PDCCH redundant information may be transmitted via a second encoding method substantially similar to the first encoding method. For example, the BS 105 may utilize the polar code to encode the first PDCCH redundant information and the second PDCCH redundant information.

In other aspects, the first PDCCH redundant information may be transmitted using resources in a first relative location 612a in a first search space 610a. The BS 105 may transmit second PDCCH redundant information via a the second beam 602-2. The second PDCCH redundant information may be transmitted using resources in a second relative location 612b in a second search space 610b. The first relative location 612a of the first PDCCH redundant information within a first search space 610a associated with the first beam 602-1 is substantially identical to a second relative location 612b of the second PDCCH redundant information within a second search space 610b associated with the second beam 602-2. For example, the first PDCCH (e.g., PDCCH redundant information) and the second PDCCH (e.g., PDCCH redundant information) may have the same aggregation level. In another example, the first relative location 612a of the first PDCCH and the second relative location 612b of the second PDCCH may start at the same resource element in the respective time-frequency resource grids, and/or may have the same duration both in time and/or frequency.

In an example, the BS 105 may transmit the first PDCCH redundant information and the second PDCCH redundant information k slots (e.g., 6, 8, 10, 12, or 14) after the UE 110 transmitted the L1 report. In another example, the BS 105 may transmit the first PDCCH redundant information and the second PDCCH redundant information at a time specified by the BS 105.

In some aspects, the UE 110 may receive the first PDCCH redundant information and the second PDCCH redundant information from the BS 105. The UE 110 may decode the first PDCCH redundant information and the second PDCCH redundant information. For example, the BS 105 may use polar code to decode the first PDCCH redundant information and the second PDCCH redundant information.

In some implementations, the UE 110 may generate combined PDCCH information based on the first PDCCH redundant information (i.e., transmitted by the first beam 602-1 via the first PDCCH) and the second PDCCH redundant information (i.e., transmitted by the second beam 602-2 via the first PDCCH). The combined PDCCH information may include a lower bit-error-rate (BER) and/or block-error-rate (BLER) than the BER and/or BLER of the first PDCCH redundant information and the BER and/or BLER of the second PDCCH redundant information. Alternatively, by using the first PDCCH and the second PDCCH, the UE 110 may obtain an "effective" channel with lower BER and/or BLER than the first PDCCH and the second PDCCH alone.

In some aspects, the trigger for beam failure detection or beam failure recovery may depend on the BER and/or BLER of a hypothetical PDCCH soft-combined from a first hypothetical PDDCH and a second hypothetical PDCCH, and not the BER and/or BLER of the first hypothetical PDCCH or the second hypothetical PDCCH. The BER and/or BLER of a hypothetical PDCCH soft-combined from a first hypothetical PDCCH and a second hypothetical PDCCH that triggers beam failure detection or beam failure recovery may be different from that of the first hypothetical PDDCH or the second hypothetical PDCCH alone. The UE 110 may have a set of hypothetical combined PDCCH transmission parameters for defining a threshold at which the soft-combined downlink radio link cannot be reliably received. The set of hypothetical combined PDCCH transmission parameters may be for SSB based radio link monitoring or CSI-RS based radio link monitoring. Examples of the parameters include DCI format, number of control OFDM symbols, aggregation levels of control channel element (CCE), bandwidths, ratio of hypothetical PDCCH RF energy to average secondary synchronization signal (SSS) RF energy, ratio of hypothetical PDCCH DMRS energy to average SSS RE energy, sub-carrier spacing, DMRS precoder granularity, REG bundle size, cyclic prefix (CP) length, mapping from resource element group (REG) to CCE, and DCI payload size. Using the set of hypothetical combined PDCCH transmission parameter, the UE can calculate the BLER or the BER of a soft-combine hypothetical PDCCH based on the SSB radio link monitoring measurement results or the CSI-RS based radio link monitoring measurement results. Beam failure detection and beam failure recovery parameters that may depend on the BER and/or BLER of the soft-combined hypothetical PDCCH include timers such as a beam failure detection, a beam failure recovery, and a beam switch procedure, and counters such as a beam failure indication and a beam switch indication.

In certain implementations, the UE 110 may transmit a termination indication to stop the soft-combining procedure. The UE 110 may transmit the termination indication due to changes in the RSRP, RSRQ, SNR, and/or SINR values of the first beam 602-1 and/or the second beam 602-2. For example, the RSRP, RSRQ, SNR, and/or SINR values of the first beam 602-1 and/or the second beam 602-2 may decrease below the values of other beams of the beams 602. Alternatively, the RSRP, RSRQ, SNR, and/or SINR values of one of the first beam 602-1 or the second beam 602-2 may decrease such that the values of the beams 602-1, 602-2 are no longer substantially similar.

Figure 7:
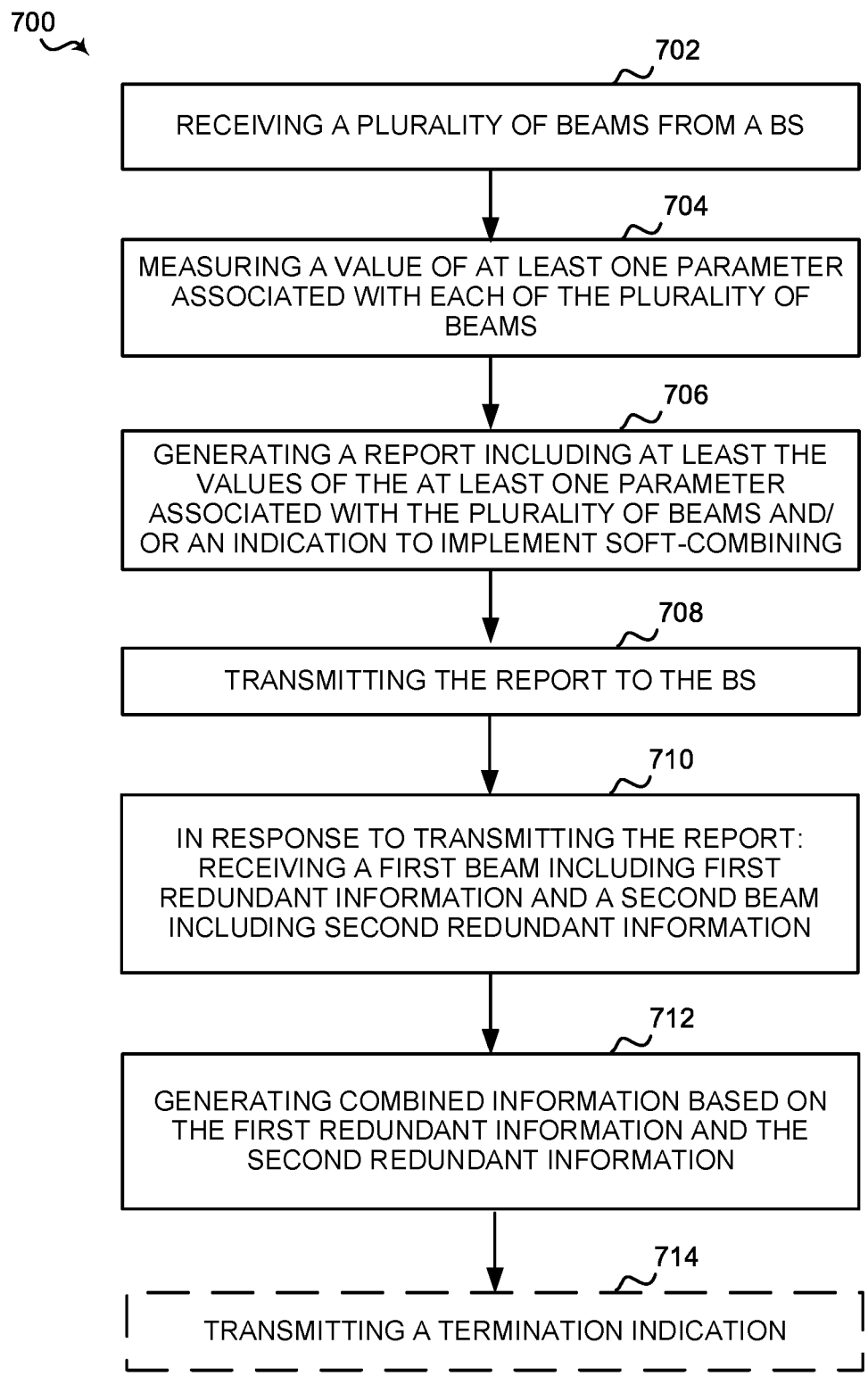
FIG. 7 is a process flow diagram, from a user equipment perspective, of an example of a method for implementing dynamic soft-combining for multi-beam transmissions, such as, for example, PDCCH.

Turning now to FIG. 7, the UE 110 may perform an example of a method 700 for performing the soft-combining procedure for multi-beam transmissions, such as, for example, PDCCH. Non-limiting examples of other multi-beam transmissions may include PDSCH, PRACH, PBCH, PUCCH, etc.

At block 702, the method 700 may receive a plurality of beams from a BS. For example, the communication component 222, the modem 220, and/or the processor 212 of the UE 110 may receive the beams 602, transmitted by the communication component 322 of the BS 105, via the one or more antennas 265, the RF front end 288, and the transceiver 204 or the receiver 206. The one or more antennas 265 may receive electro-magnetic signals from one or more antennas 265 of the UE 110. The RF front end 288 may filter, amplify, and/or extract electrical signals carried by the electro-magnetic signals. The transceiver 202 or the receiver 206 may digitize and convert the electrical signal into the data, such as reference signals, and send to the communication component 222.

In some aspects of the present disclosure, the communication component 222, the modem 220, the processor 212, the transceiver 204, the receiver 206, the transmitter 208, the one or more antennas 265, the RF front end 288, and/or the subcomponents of the RF front end 288 may be configured to and/or define means for receiving a plurality of beams from a BS.

At block 704, the method 700 may measure a value of a parameter associated with each of the plurality of beams. For example, the measurement component 224, the modem 220, and/or the processor 212 of the UE 110 may measure the RSRP, RSRQ, SNR, and/or SINR values for each beam (e.g., the first beam 602-1, the second beam 602-2, . . . the nth beam 602-$n$) of the beams 602. The measurement component 224 may utilize the reference signals to measure the RSRP, RSRQ, SNR, and/or SINR values.

In some aspects of the present disclosure, the measurement component 224, the modem 220, and/or the processor 212 may be configured to and/or define means for measuring a value of a parameter associated with each of the plurality of beams.

At block 706, the method 700 may generate a report including at least the values of the parameter associated with the plurality of beams and/or an indication to implement soft-combining. For example, the report component 226, the modem 220, and/or the processor 212 may generate a L1 report that includes the measured values of the RSRP, RSRQ, SNR, and/or SINR for each beam (e.g., the first beam 602-1, the second beam 602-2, . . . the nth beam 602-$n$) of the beams 602, and/or an indication to implement soft-combing. In one implementation, the report component 226 may include an indication that the UE 110 selects the first beam 602-1 and the second beam 602-2 for the soft-combining procedure. In other examples, the UE 110 may transmit the measured values of the RSRP, RSRQ, SNR, and/or SINR to the BS 105 and let the BS 102 select the two or more beams for the soft-combing procedure.

In some aspects of the present disclosure, the report component 226, the modem 220, and/or the processor 212 may be configured to and/or define means for generating a report including at least the values of the parameter associated with the plurality of beams and/or an indication to implement soft-combining.

At block 708, the method 700 may transmit the report to the BS. For example, the communication component 222, the modem 220, and/or the processor 212 may send the L1 report via the transceiver 202, the transmitter 208, the RF front end 288, and the one or more antennas 265. The communication component 222, the modem 220, and/or the processor 212 of the UE 110 may transmit the L1 report to the transceiver 202 or the transmitter 208. The transceiver 202 or the transmitter 208 may convert the data in the L1 report into analog signals. The RF front end 288 may filter, amplify, and package the analog signals sent by the transmitter 202. Next, the RF front end 288 may cause the one or more antennas 265 to emit electro-magnetic signals containing the data in the L1 report to the one or more antennas 365 of the BS 105.

In some aspects of the present disclosure, the communication component 222, the modem 220, the processor 212, the transceiver 204, the receiver 206, the transmitter 208, the one or more antennas 265, the RF front end 288, and/or the subcomponents of the RF front end 288 may be configured to and/or define means for transmitting the report to the BS.

At block 710, in response to transmitting the report, the method 700 may receive a first beam including first redundant information and a second beam including second redundant information. For example, the communication component 222, the modem 220, and/or the processor 212 of the UE 110 may receive the first beam 602-1 containing the first PDCCH redundant information and the second beam 602-2 containing the second PDCCH redundant information, transmitted by the communication component 322 of the BS 105, via the one or more antennas 265, the RF front end 288, and the transceiver 204 or the receiver 206. The one or more antennas 265 may receive electro-magnetic signals from one or more antennas 265 of the UE 110. The RF front end 288 may filter, amplify, and/or extract electrical signals carried by the electro-magnetic signals. The transceiver 202 or the receiver 206 may digitize and convert the electrical signal into the data, such as reference signals, and send to the communication component 222. The first PDCCH redundant information may be transmitted in a first control resource set (CORESET) and the second PDCCH redundant information may be transmitted in a second CORESET by the BS 105. In some examples, the first and second beams may include other types of redundant information.

In some aspects of the present disclosure, the communication component 222, the modem 220, the processor 212, the transceiver 204, the receiver 206, the transmitter 208, the one or more antennas 265, the RF front end 288, and/or the subcomponents of the RF front end 288 may be configured to and/or define means for, in response to transmitting the report, receiving a first beam including first redundant information and a second beam including second redundant information.

At block 712, the method 700 may generate combined information based on the first redundant information and the second redundant information. For example, the PDCCH component 228, the modem 220, and/or the processor 212 may generate the combined PDCCH information based on the first PDCCH redundant information and the second PDCCH redundant information. In other examples, the method 700 may generate other types of combined information.

In some aspects of the present disclosure, the communication component 222, the modem 220, the processor 212, the transceiver 204, the receiver 206, the transmitter 208, the one or more antennas 265, the RF front end 288, and/or the subcomponents of the RF front end 288 may be configured to and/or define means for generating combined information based on the first redundant information and the second redundant information.

In optional implementations, at block 714, the method 700 may transmit a termination indication to the BS to stop the soft-combining procedure.

In some aspects of the present disclosure, the communication component 222, the modem 220, the processor 212, the transceiver 204, the receiver 206, the transmitter 208, the one or more antennas 265, the RF front end 288, and/or the subcomponents of the RF front end 288 may be configured to and/or define means for transmitting a termination indication to the BS to stop the soft-combining procedure.

Turning now to FIG. 8, the BS 105 may perform an example of a method 800 for performing the soft-combining procedure for multi-beam transmissions, such as, for example, PDCCH. Non-limiting examples of other multi-beam transmissions may include PDSCH, PRACH, PBCH, PUCCH, etc At block 802, the method 800 may transmit a plurality of beams to a UE. For example, the communication component 322, the modem, and/or the processor 312 of the BS 105 may transmit the beams 602 to the UE 110. In one example, the communication component 322, the modem 320, and/or the processor 312 may transmit the beams via the transceiver 302, the transmitter 308, the RF front end 388, and the one or more antennas 365. The communication component 322, the modem 320, and/or the processor 312 of the UE 110 may transmit reference signals for the beams to the transceiver 302 or the transmitter 308. The transceiver 302 or the transmitter 308 may convert the reference signals into electrical signals. The RF front end 388 may filter, amplify, and package the electrical signals sent by the transmitter 302. Next, the RF front end 388 may cause the one or more antennas 365 to emit electro-magnetic signals (e.g., beams).

In some aspects of the present disclosure, the communication component 322, the modem 320, the processor 312, the transceiver 304, the receiver 306, the transmitter 308, the one or more antennas 365, the RF front end 388, and/or the subcomponents of the RF front end 388 may be configured to and/or define means for transmitting a plurality of beams to a UE.

At block 804, the method 800 may receive a report including at least values of at least one parameter associated with the plurality of beams or an indication to implement soft-combining. For example, the communication component 322, the modem, and/or the processor 312 of the BS 105 may receive the L1 report having the values of the parameters (e.g., RSRP, RSRQ, SNR, SINR) associated with the beams 602 and/or the indication by the UE 110 to implement the soft-combining procedure. The one or more antennas 365 may receive electro-magnetic signals. The RF front end 388 may filter, amplify, and/or extract electrical signals carried by the electro-magnetic signals. The transceiver 302 or the receiver 306 may digitize and convert the electrical signal into the data, such as the L1 report, and send the data to the communication component 322.

In some aspects of the present disclosure, the communication component 322, the modem 320, the processor 312, the transceiver 304, the receiver 306, the transmitter 308, the one or more antennas 365, the RF front end 388, and/or the subcomponents of the RF front end 388 may be configured to and/or define means for receiving a report including at least values of at least one parameter associated with the plurality of beams or an indication to implement soft-combining.

At block 806, in response to receiving the report, the method 800 may select at least a first beam and a second beam of the plurality of beams based on the values of the at least one parameter and/or the indication. For example, the selection component 324, the modem, and/or the processor 312 of the BS 105 may select the first beam 602-1 and the second beam 602-2 of the beams 602 based on the reported values of the RSRP, RSRQ, SNR and/or SINR, and/or the indication by the UE 110 to implement the soft-combining procedure.

In some aspects of the present disclosure, the selection component 324, the modem 320, the processor 312, the transceiver 304, the receiver 306, the transmitter 308, the one or more antennas 365, the RF front end 388, and/or the subcomponents of the RF front end 388 may be configured to and/or define means for selecting at least a first beam and a second beam of the plurality of beams based on the values of the at least one parameter and/or the indication.

At block 808, the method 800 may transmit the first beam including first redundant information and the second beam including second redundant information. For example, the communication component 322, the modem, and/or the processor 312 of the BS 105 may transmit the first beam 602-1 having the first PDCCH redundant information and the second beam 602-2 having the second PDCCH redundant information to the UE 110. In one example, the communication component 322, the modem 320, and/or the processor 312 may transmit the beams via the transceiver 302, the transmitter 308, the RF front end 388, and the one or more antennas 365. The communication component 322, the modem 320, and/or the processor 312 of the UE 110 may transmit the beams to the transceiver 302 or the transmitter 308. The transceiver 302 or the transmitter 308 may convert the beams into electrical signals. The RF front end 388 may filter, amplify, and package the electrical signals sent by the transmitter 302. Next, the RF front end 388 may cause the one or more antennas 365 to emit electro-magnetic signals of the beams. In some examples, the first and second beams may include other types of redundant information.

In some aspects of the present disclosure, the communication component 322, the modem 320, the processor 312, the transceiver 304, the receiver 306, the transmitter 308, the one or more antennas 365, the RF front end 388, and/or the subcomponents of the RF front end 388 may be configured to and/or define means for transmitting the first beam including first redundant information and the second beam including second redundant information.

Additional Implementations

Certain aspects of the present disclosure includes a method for receiving a plurality of beams from a BS, measuring a value of at least a parameter associated with each of the plurality of beams, generating a report including at least the values of the parameter associated with the plurality of beams or an indication to implement soft-combining, transmitting the report to the BS, in response to transmitting the report: receiving a first beam including first redundant information and a second beam including second redundant information, and generating combined information based on the first redundant information and the second redundant information.

Any of the methods above, wherein the at least one parameter includes a reference signal received power (RSRP), a reference signal received quality (RSRQ), a signal-to-noise ratio (SNR), or a signal-to-interference-plus-noise ratio (SINR).

Any of the methods above, further comprising, prior to receiving the first beam and the second beam, selecting the first beam and the second beam based on the values associated with the first beam and the second beam.

Any of the methods above, wherein the first redundant information is transmitted in a first control resource set (CORESET) and the second redundant information is transmitted in a second CORESET and a first relative location of the first redundant information within a first search space associated with the first beam is substantially identical to a second relative location of the second redundant information within a second search space associated with the second beam.

Any of the methods above, wherein a first channel encoding of the first redundant information is substantially similar to a second channel encoding of the second redundant information.

Any of the methods above, wherein the UE receives the first redundant information and the second redundant information a plurality of slots after transmitting the report.

Any of the methods above, wherein the UE receives the first redundant information and the second redundant information at a time determined by the BS.

A non-limiting aspect of the present disclosure includes a method for transmitting a plurality of beams to a user equipment (UE), receiving a report including at least values of at least one parameter associated with the plurality of beams or an indication to implement soft-combining, and in response to receiving the report, selecting at least a first beam and a second beam of the plurality of beams based on the values of the at least one parameter and/or the indication and transmitting the first beam including first redundant information and the second beam including second redundant information.

Any of the methods above, wherein the at least one parameter includes a reference signal received power (RSRP), a reference signal received quality (RSRQ), a signal-to-noise ratio (SNR), or a signal-to-interference-plus-noise ratio (SINR).

Any of the methods above, wherein the first redundant information is transmitted in a first control resource set (CORESET) and the second redundant information is transmitted in a second CORESET and a first relative location of the first redundant information within a first search space associated with the first beam is substantially identical to a second relative location of the second redundant information within a second search space associated with the second beam.

Any of the methods above, wherein a first channel encoding of the first redundant information is substantially similar to a second channel encoding of the second redundant information.

Any of the methods above, wherein the BS transmits the first redundant information and the second redundant information a plurality of slots after receiving the report.

Any of the methods above, wherein the BS transmits the first redundant information and the second redundant information at a time determined by the BS.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV- DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
   receiving a plurality of beams from a base station (BS);
   measuring a value of at least one parameter associated with each of the plurality of beams;
   generating a report including at least the values of the at least one parameter associated with the plurality of beams and/or an indication to implement soft-combining;
   transmitting the report to the BS; and
   in response to transmitting the report:
     receiving a first beam including first redundant information and a second beam including second redundant information; and
     generating combined information based on the first redundant information and the second redundant information.

2. The method of claim 1, wherein the first redundant information comprises first physical downlink control channel (PDCCH) redundant information, the second redundant information comprises second PDCCH redundant information, and the combined redundant information comprises combined PDCCH redundant information.

3. The method of claim 1, wherein the at least one parameter includes a reference signal received power (RSRP), a reference signal received quality (RSRQ), a signal-to-noise ratio (SNR), or a signal-to-interference-plus-noise ratio (SINR).

4. The method of claim 1, further comprising, prior to receiving the first beam and the second beam, selecting the first beam and the second beam based on the values associated with the first beam and the second beam.

5. The method of claim 1, wherein:
the first redundant information is transmitted in a first control resource set (CORESET) and the second redundant information is transmitted in a second CORESET; and
a first relative location of the first redundant information within a first search space associated with the first beam is substantially identical to a second relative location of the second redundant information within a second search space associated with the second beam.

6. The method of claim 1, wherein a first channel encoding of the first redundant information is substantially similar to a second channel encoding of the second redundant information.

7. The method of claim 1, wherein the UE receives the first redundant information and the second redundant information a plurality of slots after transmitting the report.

8. The method of claim 1, wherein the UE receives the first redundant information and the second redundant information at a time determined by the BS.

9. A user equipment (UE), comprising:
a memory;
a transceiver; and
one or more processors operatively coupled with the memory and the transceiver, the one or more processors configured to perform the steps of:
receiving a plurality of beams from a base station (BS);
measuring a value of at least one parameter associated with each of the plurality of beams;
generating a report including at least the values of the at least one parameter associated with the plurality of beams and/or an indication to implement soft-combining;
transmitting the report to the BS; and
in response to transmitting the report:
receiving a first beam including first redundant information and a second beam including second redundant information; and
generating a combined information based on the first redundant information and the second redundant information.

10. The UE of claim 9, wherein the first redundant information comprises first physical downlink control channel (PDCCH) redundant information, the second redundant information comprises second PDCCH redundant information, and the combined redundant information comprises combined PDCCH redundant information.

11. The UE of claim 9, wherein the at least one parameter includes a reference signal received power (RSRP), a reference signal received quality (RSRQ), a signal-to-noise ratio (SNR), or a signal-to-interference-plus-noise ratio (SINR).

12. The UE of claim 9, wherein the one or more processors are further configured to perform the steps of, prior to receiving the first beam and the second beam, selecting the first beam and the second beam based on the values associated with the first beam and the second beam.

13. The UE of claim 9, wherein:
the first redundant information is transmitted in a first control resource set (CORESET) and the second redundant information is transmitted in a second CORESET; and
a first relative location of the first redundant information within a first search space associated with the first beam is substantially identical to a second relative location of the second redundant information within a second search space associated with the second beam.

14. The UE of claim 9, wherein a first channel encoding of the first redundant information is substantially similar to a second channel encoding of the second redundant information.

15. The UE of claim 9, wherein the UE receives the first redundant information and the second redundant information a plurality of slots after transmitting the report.

16. The UE of claim 9, wherein the UE receives the first redundant information and the second redundant information at a time determined by the BS.

17. A non-transitory computer readable medium having instructions stored therein that, when executed by one or more processors of a user equipment (UE), cause the one or more processors to perform the steps of:
receiving a plurality of beams from a base station (BS);
measuring a value of at least one parameter associated with each of the plurality of beams;
generating a report including at least the values of the at least one parameter associated with the plurality of beams and/or an indication to implement soft-combining;
transmitting the report to the BS; and
in response to transmitting the report:
receiving a first beam including first redundant information and a second beam including second redundant information; and
generating a combined information based on the first redundant information and the second redundant information.

18. The non-transitory computer readable medium of claim 17, wherein the first redundant information comprises first physical downlink control channel (PDCCH) redundant information, the second redundant information comprises second PDCCH redundant information, and the combined redundant information comprises combined PDCCH redundant information.

19. The non-transitory computer readable medium of claim 17, wherein the at least one parameter includes a reference signal received power (RSRP), a reference signal received quality (RSRQ), a signal-to-noise ratio (SNR), or a signal-to-interference-plus-noise ratio (SINR).

20. The non-transitory computer readable medium of claim 17, further comprises instructions that, when executed by the one or more processors, cause the one or more processors to, prior to receiving the first beam and the second beam, selecting the first beam and the second beam based on the values associated with the first beam and the second beam.

21. The non-transitory computer readable medium of claim 17, wherein:
the first redundant information is transmitted in a first control resource set (CORESET) and the second redundant information is transmitted in a second CORESET; and a first relative location of the first redundant information within a first search space associated with the first beam is substantially identical to a second relative location of the second redundant information within a second search space associated with the second beam.

22. The non-transitory computer readable medium of claim 17, wherein a first channel encoding of the first redundant information is substantially similar to a second channel encoding of the second redundant information.

23. The non-transitory computer readable medium of claim 17, wherein the UE receives the first redundant information and the second redundant information a plurality of slots after transmitting the report.

24. The non-transitory computer readable medium of claim 17, wherein the UE receives the first redundant information and the second redundant information at a time determined by the BS.

25. A user equipment (UE), comprising:
 means for receiving a plurality of beams from a base station (BS);
 means for measuring a value of at least one parameter associated with each of the plurality of beams;
 means for generating a report including at least the values of the at least one parameter associated with the plurality of beams and/or an indication to implement soft-combining;
 means for transmitting the report to the BS; and
 in response to transmitting the report:
 means for receiving a first beam including first redundant information and a second beam including second redundant information; and
 means for generating combined information based on the first redundant information and the second redundant information.

26. The UE of claim 25, wherein the first redundant information comprises first physical downlink control channel (PDCCH) redundant information, the second redundant information comprises second PDCCH redundant information, and the combined redundant information comprises combined PDCCH redundant information.

27. The UE of claim 25, wherein the at least one parameter includes a reference signal received power (RSRP), a reference signal received quality (RSRQ), a signal-to-noise ratio (SNR), or a signal-to-interference-plus-noise ratio (SINR).

28. The UE of claim 25, further comprising, prior to receiving the first beam and the second beam, means for selecting the first beam and the second beam based on the values associated with the first beam and the second beam.

29. The UE of claim 25, wherein:
 the first redundant information is transmitted in a first control resource set (CORESET) and the second redundant information is transmitted in a second CORESET; and
 a first relative location of the first redundant information within a first search space associated with the first beam is substantially identical to a second relative location of the second redundant information within a second search space associated with the second beam.

30. The UE of claim 25, wherein a first channel encoding of the first redundant information is substantially similar to a second channel encoding of the second redundant information.

* * * * *